(12) United States Patent
Oh

(10) Patent No.: US 9,296,419 B2
(45) Date of Patent: Mar. 29, 2016

(54) STEERING APPARATUS FOR VEHICLE

(71) Applicant: Mando Corporation, Pyeongtaek-si, Gyeonggi-do (KR)

(72) Inventor: Jin Seok Oh, Suwon-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/687,555

(22) Filed: Apr. 15, 2015

(65) Prior Publication Data
US 2015/0298734 A1  Oct. 22, 2015

(30) Foreign Application Priority Data

Apr. 16, 2014  (KR) .................. 10-2014-0045241

(51) Int. Cl.
  *B62D 7/22*  (2006.01)
  *B62D 1/189*  (2006.01)
(52) U.S. Cl.
  CPC ............... *B62D 7/224* (2013.01); *B62D 1/189* (2013.01)
(58) Field of Classification Search
  USPC .......... 280/776, 779; 74/492, 493; 9/776, 779
  See application file for complete search history.

(56) References Cited

U.S. PATENT DOCUMENTS

| 4,900,059 | A | * | 2/1990 | Kinoshita | B62D 1/181 280/775 |
|---|---|---|---|---|---|
| 6,139,057 | A | * | 10/2000 | Olgren | B62D 1/184 280/775 |
| 7,322,608 | B2 | * | 1/2008 | Yamamoto | B62D 1/184 280/775 |
| 8,997,602 | B2 | * | 4/2015 | Tanaka | B62D 1/184 280/775 |
| 2005/0104353 | A1 | * | 5/2005 | Ikeda | B62D 1/187 280/775 |
| 2010/0139438 | A1 | * | 6/2010 | Appleyard | B62D 1/184 74/493 |
| 2011/0056324 | A1 | * | 3/2011 | Park | B62D 1/184 74/493 |
| 2013/0160596 | A1 | * | 6/2013 | Tanaka | B62D 1/185 74/493 |
| 2013/0319163 | A1 | * | 12/2013 | Davies | B62D 1/184 74/493 |
| 2014/0144277 | A1 | * | 5/2014 | Kakishita | B62D 1/187 74/493 |

* cited by examiner

*Primary Examiner* — Toan To
(74) *Attorney, Agent, or Firm* — McDermott Will & Emery LLP

(57) ABSTRACT

The present disclosure relates to an steering apparatus and, according to an embodiment of the present disclosure, occurrence of noise resulting from slip between an inner surface of a fixing bracket and a side surface of a hinge pipe, which faces the inner surface, is prevented, thereby providing the driver with a comfortable steering feeling.

9 Claims, 6 Drawing Sheets

(A)

(B)

(A)

(B)

STEERING APPARATUS FOR VEHICLE

CROSS-REFERENCE TO RELATED APPLICATION

This application claims priority from and the benefit under U.S.C. §119(a) of Korean Patent Application No. 10-2014-0045241, filed on Apr. 16, 2014, which is hereby incorporated by reference for all purposes as if fully set forth herein.

BACKGROUND OF THE INVENTION

1. Field of the Invention

The present invention relates to an steering apparatus and, more particularly, to an steering apparatus capable of preventing the occurrence of noise resulting from slip between an inner surface of a fixing bracket and a side surface of a hinge pipe, which faces the inner surface, thereby providing the driver with a comfortable steering environment.

2. Description of the Prior Art

FIG. 1 is a perspective view illustrating a conventional steering apparatus.

As illustrated in FIG. 1, a conventional steering apparatus 100 is configured such that a hollow inner tube 105, which surrounds a steering shaft 101, is inserted into an outer tube 103, and, when a tilt lever is fastened or released, a tilt bracket is contracted or loosed in the diameter direction, i.e. in a direction perpendicular to the steering shaft 101, thereby performing a tilting or telescopic function.

The inner tube 105 is provided in a hollow shape so as to surround the steering shaft 101, and a lower mounting bracket 107 is coupled to a cowl bracket (not illustrated), which is coupled to the chassis, via a tilt hinge tube 111 and is configured to rotate about the tilt hinge tube 111, which serves as a shaft, when performing a tilting function; and, when performing a telescoping function, the outer tube 103 slides in the axial direction along the inner tube 105.

A mounting bracket 109 is coupled to the outer peripheral side of the outer tube 103, and the upper surface of the mounting bracket 109 is fixed to the chassis of the automobile, thereby fixing the steering device 100.

An electronic control device 117 and a gear housing 113 are coupled to one side of the steering device 100, the electronic control device 117 being connected to a torque sensor, and the gear housing 113 containing a reducer which assists the steering force by means of a driving force from a motor 115.

However, such a conventional steering apparatus has a problem in that, since smooth surfaces of opposite ends of the tilt hinge tube are coupled so as to abut the inner peripheral surface of the cowl bracket, slip occurs between the smooth surfaces of the opposite ends of the tilt hinge tube and the inner peripheral surface of the cowl bracket, when the driver operates the steering wheel or when an inverse input is applied from wheels, and causes noise, making it difficult to provide the user with a comfortable steering environment.

SUMMARY OF THE INVENTION

The present invention has been made in view of the above-mentioned background, and an aspect of the present invention is to provide an steering apparatus capable of preventing the occurrence of noise resulting from slip between an inner surface of a fixing bracket and a side surface of a hinge pipe, which faces the inner surface, thereby providing the driver with a comfortable steering environment.

The aspect of the present invention is not limited thereto, and other unmentioned aspects of the present invention may be clearly appreciated by those skilled in the art from the following descriptions.

According to an embodiment of the present invention, an steering apparatus may be provided, including: a hinge pipe penetrated by a fixing member, which connects a tube that surrounds a steering shaft and a fixing bracket such that the tube is rotatably coupled to the fixing bracket, the hinge pipe having multiple protrusions formed in a circumferential direction on a side surface, which faces an inner surface of the fixing bracket, so as to prevent slip noise between the inner surface of the fixing bracket and the side surface that faces the inner surface.

In addition, an steering apparatus may be provided wherein the protrusions include multiple support protrusions formed to protrude in the axial direction of the hinge pipe so as to have different lengths.

In addition, an steering apparatus may be provided wherein recessed portions are formed on lower portions of the protrusions so as to be recessed in the circumferential direction.

According to an embodiment of the present invention, occurrence of noise resulting from slip between an inner surface of a fixing bracket and a side surface of a hinge pipe, which faces the inner surface, is prevented, thereby providing the driver with a comfortable steering environment.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, some embodiments of the present invention will be described in detail with reference to the exemplary drawings. In the following description, It should be appreciated that when one component is described as being "connected," "coupled" or "joined" to another component, a third component may be "connected," "coupled," and "joined" between the first and second components, although the first component may be directly connected, coupled or joined to the second component.

Figure 1:
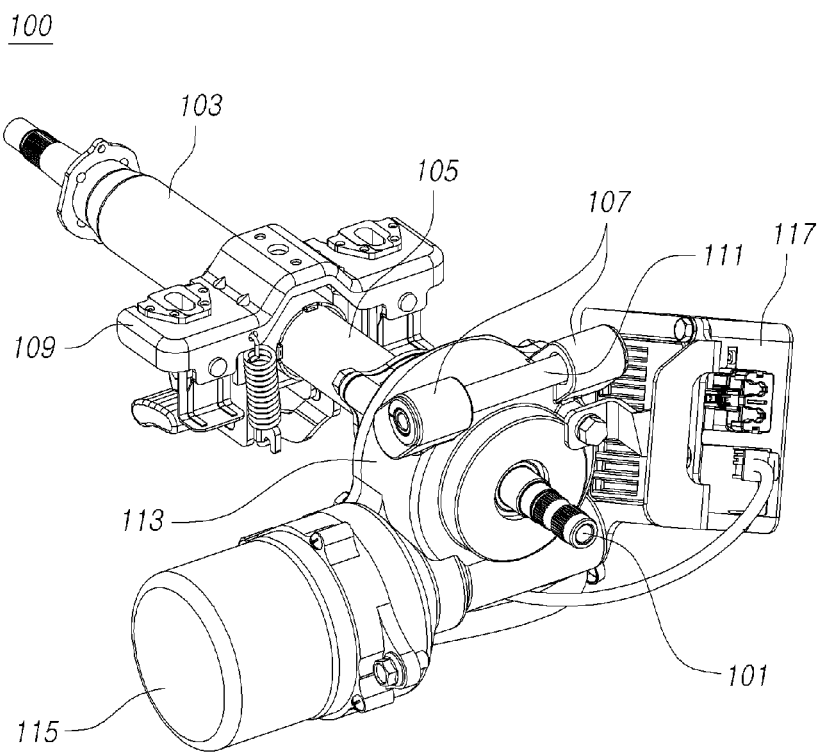
FIG. 1 is a perspective view illustrating a conventional steering apparatus.
Figure 2:
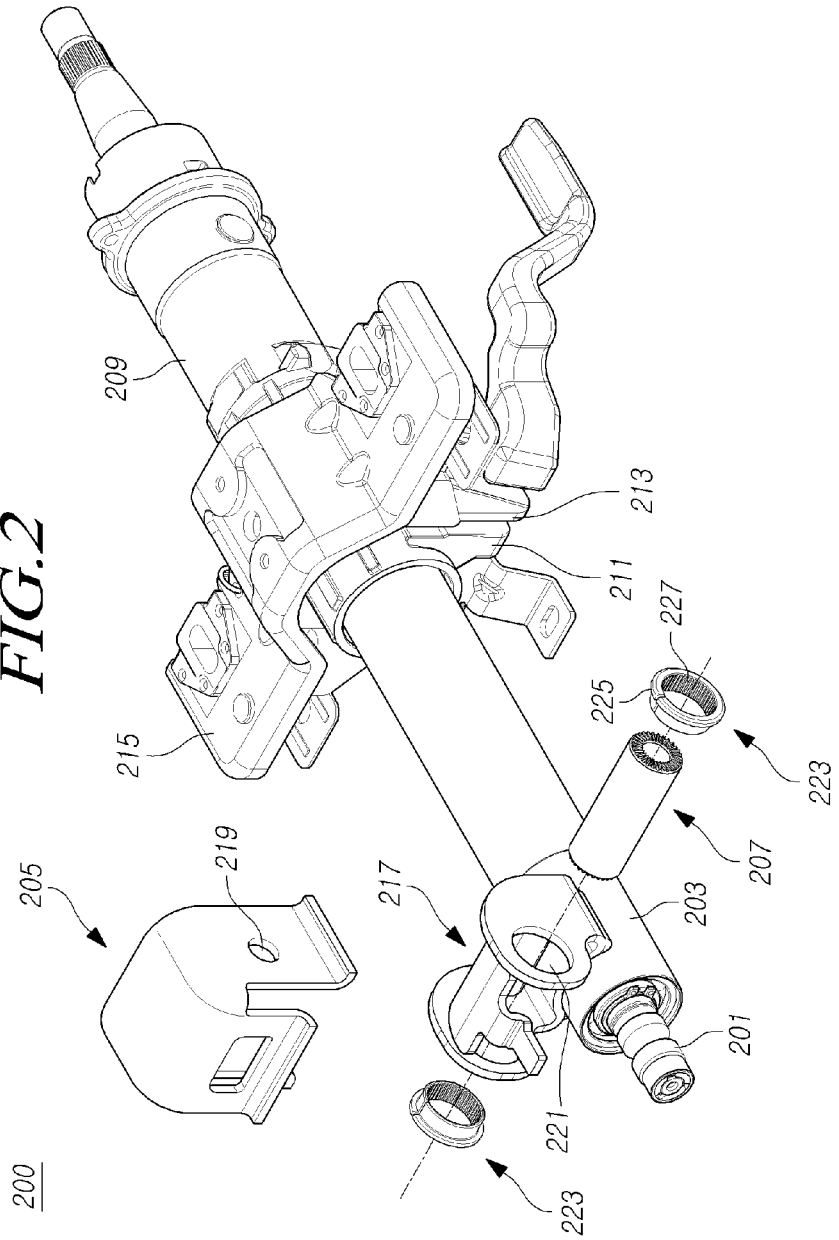
FIG. 2 is a partially exploded perspective view of an steering apparatus according to an embodiment of the present invention.
Figure 3:
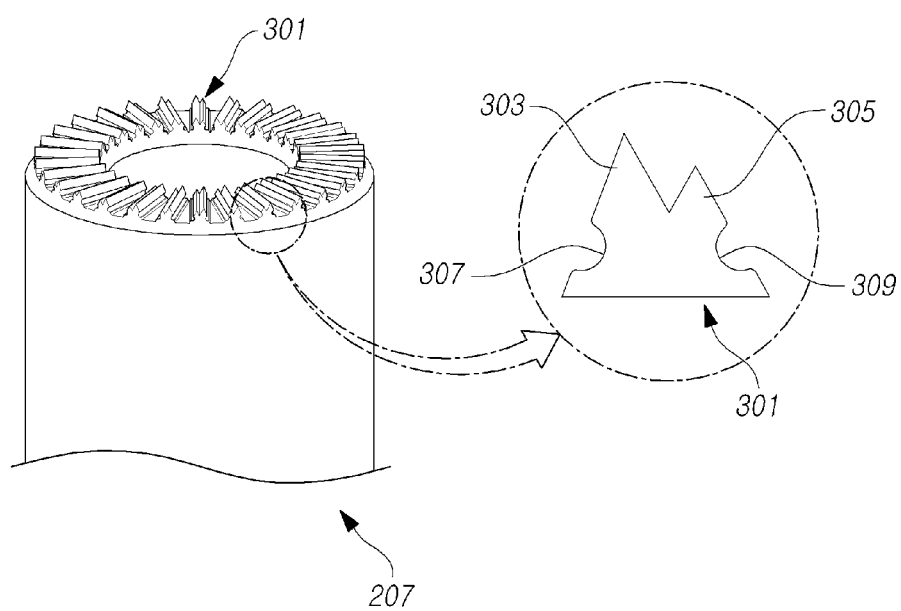
FIG. 3 is a diagram illustrating a hinge pipe of FIG. 2.
Figure 4:
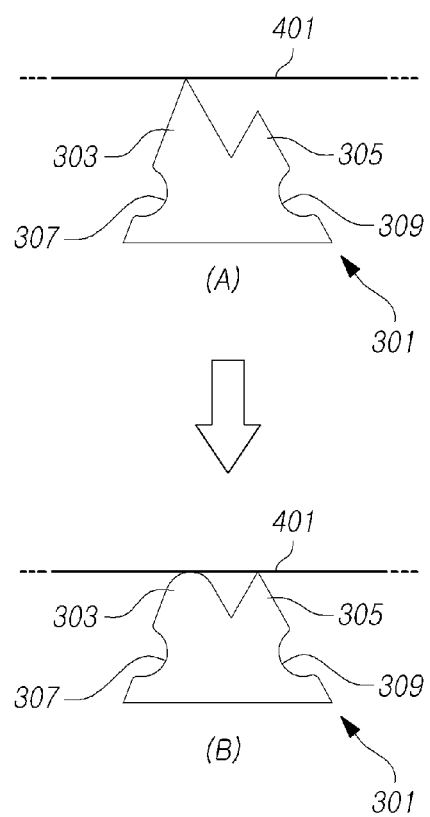
FIG. 4 to FIG. 6 are diagrams illustrating processes of wearing of protrusions of the hinge pipe of FIG. 2.
Figure 5:
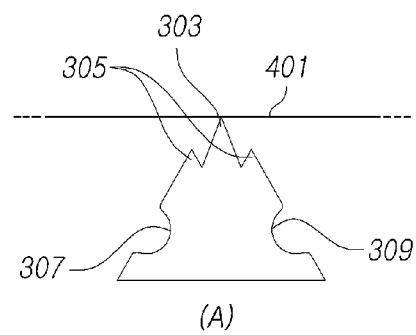
Figure 5:
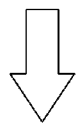
Figure 5:
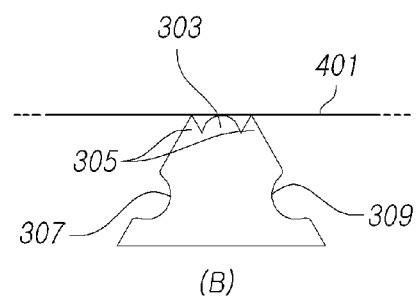
Figure 6:
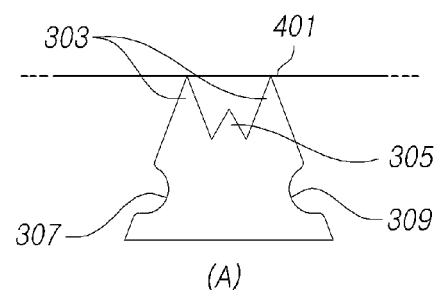
Figure 6:
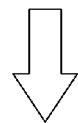
Figure 6:
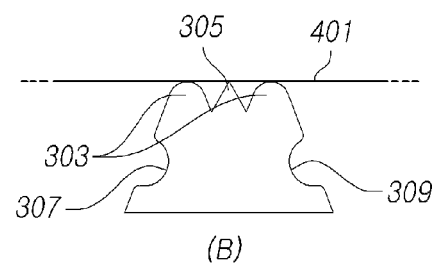

FIG. 2 is a partially exploded perspective view of an steering apparatus according to an embodiment of the present invention. FIG. 3 is a diagram illustrating a hinge pipe of FIG. 2. FIG. 4 to FIG. 6 are diagrams illustrating processes of wearing of protrusions of the hinge pipe of FIG. 2.

As illustrated in the drawings, an steering apparatus 200 according to an embodiment of the present invention is characterized by including: a hinge pipe 207 penetrated by a fixing member (not illustrated), which connects a tube 203 that surrounds a steering shaft 201 and a fixing bracket 205 such that the tube 203 is rotatably coupled to the fixing bracket 205, the hinge pipe 207 having multiple protrusions 301 formed in a circumferential direction on a side surface, which faces an inner surface of the fixing bracket 205, so as to prevent slip noise between the inner surface of the fixing bracket 205 and the side surface that faces the inner surface.

The tube 203 is configured to surround the steering shaft 201 and is provided in a hollow shape; and the steering shaft 201 is connected to a steering wheel (not illustrated) such that, when the driver rotates the steering wheel, the steering shaft 201 rotates while being interlocked with the steering wheel.

Meanwhile, the tube 203 is inserted and coupled to an upper tube 209 such that, when the driver makes a telescopic operation, the tube 203 is drawn into or out of the upper tube 209, thereby performing a telescopic operation; telescopic guide portions 211 are formed on both sides of the lower portion of the upper tube 209, respectively, and plate brackets 213 are provided on both sides of the telescopic guide portions 211, respectively.

In addition, the upper ends of the plate brackets 213 connected to each other, thereby forming an approximately "∩" shape, and the plate brackets 213 are coupled to a mounting bracket 215 and then fixed to the chassis.

In addition, a bracket 217 is provided on an end of the tube 203, a through-hole 221 is formed in the bracket 217 such that a hinge pipe 207 (described later) is fitted and coupled to the through-hole 221, and the center axis of the through-hole 221 formed in the bracket 217 becomes a rotation reference for a tilting operation.

Furthermore, fixing guides 223 may be further provided between the through-hole 221 and the hinge pipe 207; the fixing guides 223 have the shape of hollow cylinders, have ribs 225 formed on ends to protrude in the outward diameter direction, respectively, and have serrations 227 formed on inner peripheral surfaces in the circumferential direction, respectively, such that both ends of the hinge pipe 207 are firmly fixed to the inner peripheral surfaces of the fixing guides 223.

Next, the hinge pipe 207 is formed in a hollow tube structure penetrated by a fixing member (not illustrated), which connects the tube 203 that surrounds the steering shaft 201 and the fixing bracket 205 such that the tube 203 is rotatably coupled to the fixing bracket 205.

That is, while the hinge pipe 207 is coupled to the bracket 217, the fixing bracket 205 is arranged in the coupling position, and a fixing member (not illustrated) is coupled by penetrating the through-hole 219 of the fixing bracket 205 and the hinge pipe 207 such that the tube 203, which has the bracket 217 formed thereon, is coupled to be able to rotate with regard to the fixing bracket 205, thereby performing a tilting operation.

Meanwhile, multiple protrusions 301 are formed on a side surface of the hinge pipe 207, which faces an inner surface of the fixing bracket 205, in the circumferential direction, and the protrusions 301 prevent slip noise from occurring between the inner surface of the fixing bracket 205 and the side surface of the hinge pipe 207 facing the inner surface.

That is, the opposite ends of a conventional tilt hinge tube have smooth surfaces formed thereon, as described above, and, when the driver operates the steering wheel or when an inverse input is applied from wheels, noise is generated by slip occurring between the smooth surfaces of the opposite ends of the tilt hinge tube and the inner peripheral surface of the cowl bracket; according to an embodiment of the present invention, in contrast, the protrusions 301 of the hinge pipe 207 abut the inner surface of the fixing bracket 205 such that the area of contact between the hinge pipe 207 and the fixing bracket 205 is substantially reduced compared with the prior art, thereby preventing the occurrence of slip noise between the hinge pipe 207 and the fixing bracket 205.

Furthermore, the protrusions 301 formed on a side surface of the hinge pipe 207 may be provided in such a structure that multiple support protrusions 303 and 305 are formed to protrude in the axial direction of the hinge pipe 207 with different lengths; an example is illustrated in the drawings in which two support protrusions 303 and 305 are formed.

When the protrusions 301 are provided in such a structure that multiple support protrusions 303 and 305, which are different from each other, are formed as described above, the first support protrusion 303, which protrudes more, initially abuts the inner surface 401 of the fixing bracket ((a) in FIG. 4) as illustrated in FIG. 4; and, even if the first support protrusion 303 is worn later, the second support protrusion 305, which protrudes less, then abuts the inner surface 401 of the fixing bracket ((b) in FIG. 4), thereby preventing occurrence of slip noise.

Particularly, the support protrusions may include a first support protrusion 303, which abuts the inner surface 401 of the fixing bracket, as illustrated in FIG. 4, and a second support protrusion 305, which is formed on one side of the first support protrusion 303, and which is spaced from the inner surface 401 of the fixing bracket.

In addition, the support protrusions may include a first support protrusion 303, which abuts the inner surface 401 of the fixing bracket, as illustrated in FIG. 5, and a pair of second support protrusions 305, which are formed on one side and the other side of the first support protrusion 303, respectively, and which are spaced from the inner surface 401 of the fixing bracket.

In addition, the support protrusions may include a pair of first support protrusions 303, which abut the inner surface 401 of the fixing bracket, as illustrated in FIG. 6, and a second support protrusion 305, which is formed between the first support protrusions 303, and which is spaced from the inner surface 401 of the fixing bracket.

Meanwhile, the protrusions 301 formed on a side surface of the hinge pipe 207 may be formed to be spaced apart at the same interval in the circumferential direction.

In addition, recessed portions 307 and 309 may be formed on one side surface or both side surfaces of the protrusions 301 to be recessed in the circumferential direction; such formation of recessed portions 307 and 309 on one side surface or both side surfaces of the protrusions 301 can supplement the fracture strength regarding parts of the protrusions 301 where stress concentrates (lower parts of the protrusions 301).

Particularly, when recessed portions 307 and 309 are formed by applying forces to both sides of lower portions of the protrusions 301 and thereby indenting them, the texture of the recessed parts becomes denser and improves strength; therefore, it becomes possible to supplement the fracture strength of stress-concentrating parts of the lower portions of the protrusions 301 and to improve the durability of the steering device itself.

As described above, according to an embodiment of the present invention, the occurrence of noise resulting from slip between an inner surface of a fixing bracket and a side surface of a hinge pipe, which faces the inner surface, is prevented, thereby providing the user with a comfortable steering environment.

Even if it was described above that all of the components of an embodiment of the present invention are coupled as a single unit or coupled to be operated as a single unit, the present invention is not necessarily limited to such an embodiment. The scope of the present invention shall be construed on the basis of the accompanying claims in such a manner that all of the technical ideas included within the scope equivalent to the claims belong to the present invention.

BRIEF DESCRIPTION OF REFERENCE NUMERALS 200 steering apparatus according to an embodiment of the present invention
201: steering shaft
203: tube
205: fixing bracket
207: hinge pipe
209: upper tube
211: telescopic guide portion
213: plate bracket
215: mounting bracket
217: bracket
219: coupling hole
221: through-hole
223: fixing guide
225: rib
227: serration
301: protrusion
303: first support protrusion
305: second support protrusion
307, 309: recessed portions

What is claimed is:

1. A steering apparatus comprising: a hinge pipe fitted into and penetrating through a through-hole of a fitting bracket that is mounted to an upper outer portion of a tube,
wherein the tube surrounds a steering shaft in a direction orthogonal to that of the hinge pipe and is rotatably coupled to a fixing bracket so that a rotational axis of the tube is perpendicular to that of the hinge pipe,
wherein the hinge pipe has multiple protrusions formed on each end surface thereof around a through-hole that is formed along the rotational axis of the hinge pipe, and
wherein the each end surface faces inner surfaces of the fixing bracket to prevent slip noise between the inner surfaces of the fixing bracket and the end surfaces of the hinge pipe.

2. The steering apparatus of claim 1, wherein each of the protrusions comprises at least two support protrusions formed to protrude in an axial direction of the hinge pipe with different lengths.

3. The steering apparatus of claim 2, wherein the support protrusions comprise a first support protrusion abutting the inner surface of the fixing bracket and a second support protrusion formed on one side of the first support protrusion and spaced from the inner surface of the fixing bracket.

4. The steering apparatus of claim 2, wherein the support protrusions comprise a first support protrusion abutting the inner surface of the fixing bracket and a pair of second support protrusions formed on one side and the other side of the first support protrusions, respectively, and spaced from the inner surface of the fixing bracket.

5. The steering apparatus of claim 2, wherein the support protrusions comprise a pair of first support protrusions abutting the inner surface of the fixing bracket and a second support protrusion formed between the first support protrusions and spaced from the inner surface of the fixing bracket.

6. The steering apparatus of claim 1, wherein the multiple protrusions are formed on each end surface of the hinge pipe to be spaced apart at an identical interval in the circumferential direction.

7. The steering apparatus of claim 1, wherein recessed portions are formed on one side surface or both side surfaces of the protrusions.

8. The steering apparatus of claim 1, further comprising: a fixing guide having a hollow cylinder shape and provided between the through-hole of the fitting bracket and the hinge pipe inside the through-hole of the fitting bracket,
wherein the fixing guide has a rib protruding outwards from an outer surface of an end of the fixing guide and has serrations formed on an inner surface of the fixing guide, and
wherein both ends of the hinge pipe are firmly fixed to the inner surface of the fixing guide.

9. A steering apparatus comprising: a hinge pipe fitted into and penetrating through a through-hole of a fitting bracket that is mounted to an upper outer portion of a tube which surrounds a steering shaft and which is rotatably coupled to a fixing bracket, the hinge pipe having multiple protrusions formed in a circumferential direction on an end surface of the hinge pipe,
wherein the end surface of the hinge pipe faces an inner surface of the fixing bracket to prevent slip noise between the inner surface of the fixing bracket and the end surface of the hinge pipe, and
wherein each of the protrusions comprises at least two support protrusions protruding in an axial direction of the hinge pipe with different lengths.

* * * * *